US007230898B1

(12) United States Patent
Yokota et al.

(10) Patent No.: US 7,230,898 B1
(45) Date of Patent: Jun. 12, 2007

(54) REPRODUCING APPARATUS AND RECORDING APPARATUS

(75) Inventors: Teppei Yokota, Chiba (JP); Nobuyuki Kihara, Tokyo (JP)

(73) Assignee: Sony Corporation, Tokyo (JP)

(*) Notice: Subject to any disclaimer, the term of this patent is extended or adjusted under 35 U.S.C. 154(b) by 150 days.

(21) Appl. No.: 09/654,003

(22) Filed: Sep. 1, 2000

(30) Foreign Application Priority Data

Sep. 3, 1999 (JP) .................................. 11-250194

(51) Int. Cl.
*G11B 27/00* (2006.01)
(52) U.S. Cl. ................................ 369/53.21; 369/59.11; 369/124.6; 380/203; 380/236
(58) Field of Classification Search ............. 369/47.13, 369/53.21, 47.18, 53.2, 53.22, 53.27, 47.12, 369/47.14, 47.19, 53.11, 53.37, 47.16, 47.2, 369/47.23, 275.3, 47.21, 47.22, 59.24, 30.24, 369/30.19, 83; 380/217, 201, 203, 213, 21, 380/22, 3, 4, 236; 713/160, 193; 348/555, 348/554, 565; 360/13, 18, 49, 60; 386/97, 386/99, 109; 370/216
See application file for complete search history.

(56) References Cited

U.S. PATENT DOCUMENTS

| | | | | |
|---|---|---|---|---|
| 5,535,008 | A | * | 7/1996 | Yamagishi et al. .......... 386/109 |
| 5,596,565 | A | * | 1/1997 | Yonemitsu et al. ....... 369/275.3 |
| 5,682,425 | A | | 10/1997 | Enari ........................... 380/10 |
| 5,710,813 | A | | 1/1998 | Terui et al. .................... 380/4 |
| 5,737,290 | A | * | 4/1998 | Ohmori ................... 369/53.21 |
| 5,802,174 | A | * | 9/1998 | Sako et al. ................. 380/201 |
| 5,883,959 | A | * | 3/1999 | Kori ........................... 380/203 |
| 5,920,529 | A | * | 7/1999 | Ota et al. ..................... 369/84 |
| 6,021,199 | A | * | 2/2000 | Ishibashi ................... 380/217 |
| 6,072,771 | A | * | 6/2000 | Anderson et al. ........... 370/216 |
| 6,097,557 | A | * | 8/2000 | Inoue et al. ................... 360/13 |
| 6,285,408 | B1 | * | 9/2001 | Choi et al. ................... 348/555 |
| 6,285,717 | B1 | * | 9/2001 | Bahng et al. .......... 375/240.29 |
| 6,288,989 | B1 | * | 9/2001 | Ro et al. ..................... 369/47.13 |
| 6,289,102 | B1 | * | 9/2001 | Ueda et al. ................. 380/201 |
| 6,301,569 | B1 | * | 10/2001 | Oshima et al. .......... 369/47.19 |
| 6,351,439 | B1 | * | 2/2002 | Miwa et al. .............. 369/47.18 |
| 6,535,467 | B1 | * | 3/2003 | Jung et al. ................ 369/47.16 |
| 6,587,948 | B1 | * | 7/2003 | Inazawa et al. ............. 713/193 |
| 6,707,774 | B1 | * | 3/2004 | Kuroda et al. ........... 369/53.21 |
| 6,973,015 | B1 | * | 12/2005 | Murakami et al. ....... 369/47.21 |

FOREIGN PATENT DOCUMENTS

EP 802535 A1 * 10/1997

OTHER PUBLICATIONS

Database WPI Section E1, Week 199803 Derwent Publications Ltd., London, GB; Class W02, AN 1998-019018 XP002154264 & AU 20104 97 A (Milland R J) Nov. 13, 1997.

* cited by examiner

*Primary Examiner*—Tan Dinh
*Assistant Examiner*—Kim-Kwok Chu
(74) *Attorney, Agent, or Firm*—Finnegan, Henderson, Farabow, Garrett & Dunner L.L.P.

(57) ABSTRACT

This invention relates to a reproducing apparatus compatible with a storage medium storing copyright-protected and copyright-unprotected files, the reproducing apparatus being capable of reproducing any one of the files stored on the medium, the reproducing apparatus comprising: demodulating means for demodulating any one of the copyright-protected files in one way and any one of the copyright-unprotected files in a different way; selective operation executing means operated to select either any one of the copyright-protected files or any one of the copyright-unprotected files as a file to be reproduced; and controlling means for causing the demodulating means to select one of the two different ways of demodulation depending on whether a copyright-protected file or a copyright-unprotected file has been selected by operation of the selective operation executing means.

4 Claims, 11 Drawing Sheets

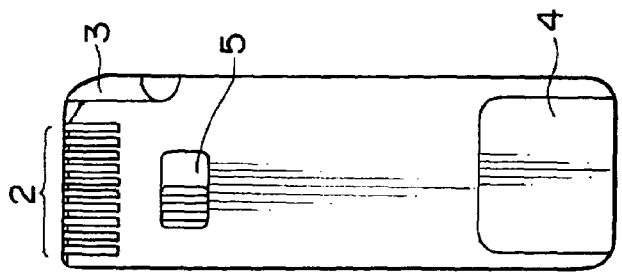
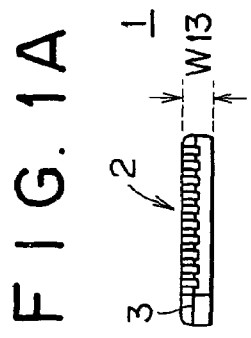
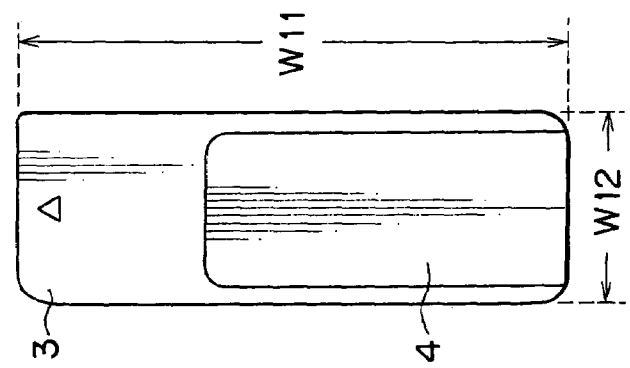

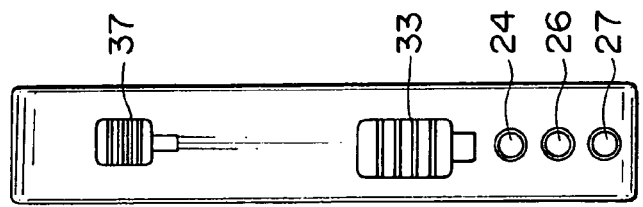
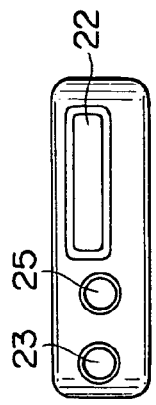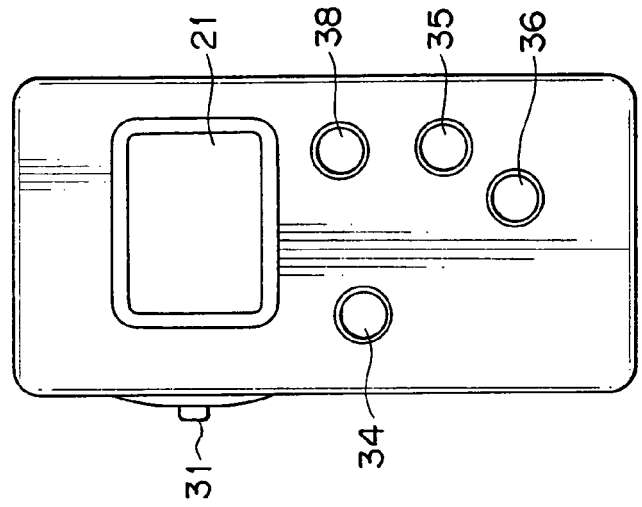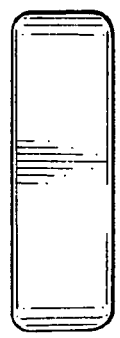
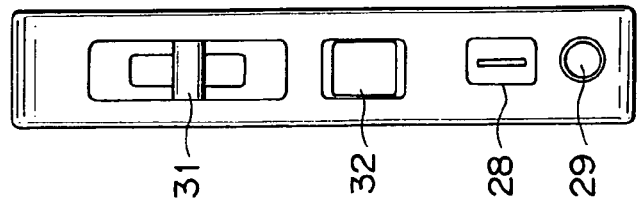

FILE SYSTEM
PROCESSING HIERARCHY

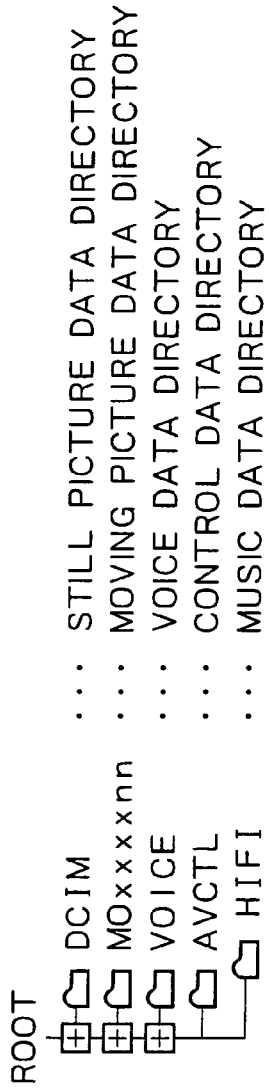

```
ROOT
├── DCIM          ···  STILL PICTURE DATA DIRECTORY
├── MOxxxxnn      ···  MOVING PICTURE DATA DIRECTORY
├── VOICE         ···  VOICE DATA DIRECTORY
├── AVCTL         ···  CONTROL DATA DIRECTORY
└── HIFI          ···  MUSIC DATA DIRECTORY
    │
    ├── TRKLIST.MSF   ···  TRACK INFORMATION MANAGEMENT FILE : THIS FILE
    │                      DESCRIBES PARTS, NAMES AND CONTENT KEYS OF
    │                      TRACKS AND OTHER POINTERS POINTING TO THE
    │                      INFORMATION FILES BELOW.
    │
    │   NAME1        ···  THIS FILE REPRESENTS A BLOCK TO WHICH TO WRITE
    │                      (IN ONE-BYTE CODE) A NAME REPRESENTING THE
    │                      STICK-SHAPED MEMORY AND NAMES OF STORED PIECES
    │                      OF MUSIC USING ASCII/8859-1 CHARACTER CODES.
    │
    │   NAME2        ···  THIS FILE REPRESENTS A BLOCK TO WHICH TO WRITE
    │                      (IN TWO-BYTE CODE) A NAME REPRESENTING THE
    │                      STICK-SHAPED MEMORY AND NAMES OF STORED PIECES
    │                      OF MUSIC IN MS-JIS, KOREAN ALPHABET, CHINESE
    │                      CHARACTERS, ETC.
    │
    ├── TRKLISTB.MSF  ···  THIS IS A BACKUP FILE THAT PROVIDES A COMPLETE
    │                      COPY OF THE TRACK INFORMATION MANAGEMENT FILE
    │                      "TRKLIST.MSF".
    │
    ├── INFLIST.MSF   ···  THIS IS AN ADDITIONAL INFORMATION FILE THAT RECORDS
    │                      SUCH ADDITIONAL INFORMATION AS NAMES OF ARTISTS,
    │                      ISRC CODES, TIME-STAMPS, AND STILL PICTURE DATA.
    │
    ├── A3Dnnnnn.MSA  ···  MUSIC DATA FILE PURSUANT TO ATRAC3
    │   ~
    └── A3Dnnnnn.MSA
```

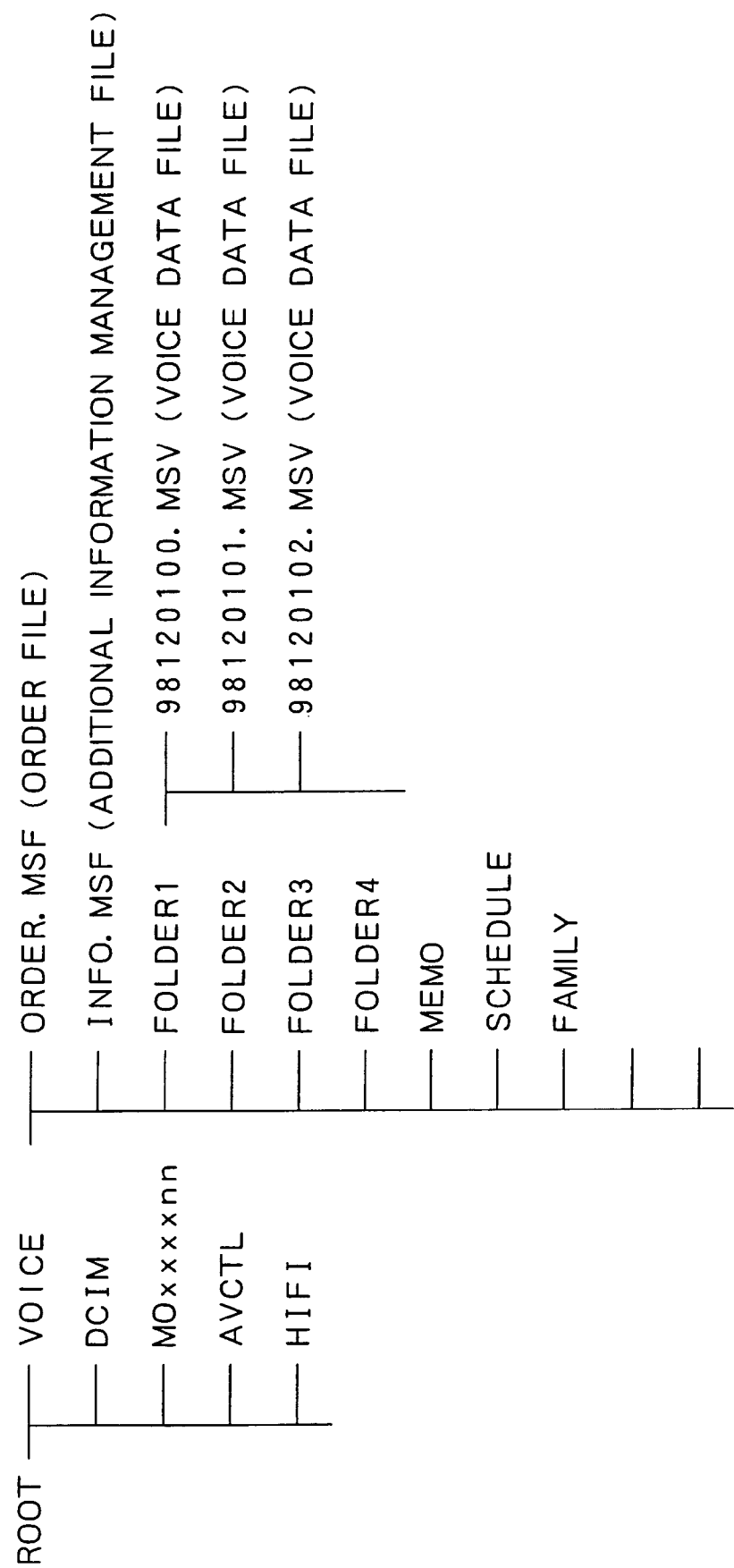

REPRODUCING APPARATUS AND RECORDING APPARATUS

BACKGROUND OF THE INVENTION

The present invention relates to a reproducing apparatus and a recording apparatus used in conjunction with storage media. More particularly, the invention relates to a reproducing apparatus and a recording apparatus for handling copyright-protected and copyright-unprotected files as data to be recorded to a storage medium.

Today, recording and reproducing apparatuses capable of recording and reproducing various kinds of audio information as digital data have gained widespread use.

Audio information recorded and reproduced by such recording and reproducing apparatus is of high sound quality because the information is composed of digital data. With no deterioration in sound quality after repeated copying, such digital data need to be protected for copyrights particularly in the case of pieces of music created by artists. Arrangements have been proposed to encrypt audio information of high sound quality such as music requiring copyright protection (simply called the music information hereunder) upon recording, and to decrypt the encrypted music information for playback. The proposed arrangements protect copyrights illustratively by preventing any illegal or inappropriate device with no decryption function from recording or reproducing data correctly or from copying data illegally.

On the other hand, there is little need to maintain high sound quality or to protect copyrights regarding audio information acquired by users recording their own voice as a way of taking notes (the information will be called the voice information hereunder as opposed to the music information).

Under these circumstances, it has been possible to envisage a recording and reproducing system capable of recording copyright-protected, encrypted music information and copyright-unprotected, unencrypted voice information to a single storage medium in a mixed manner, and of reproducing such information from the storage medium.

One suitable way to manage such music and voice information held mixedly on the same storage medium is by adopting a directory management scheme used by personal computers. That is, a group of music information files and a group of voice information files are placed under a different directory each for separated information management.

SUMMARY OF THE INVENTION

Under the above-mentioned directory management scheme, music information (subject to copyright protection) and voice information (not subject to copyright protection) may be recorded on the storage medium for directory-based management by a recording and reproducing apparatus. In that case, users will find it more convenient if at least music information and voice information are distinguished from each other when recorded or reproduced to or from the medium through suitable operations.

In carrying out the invention in view of the above circumstances and according to one aspect thereof, there is provided a reproducing apparatus compatible with a storage medium storing copyright-protected and copyright-unprotected files, the reproducing apparatus being capable of reproducing any one of the files stored on the medium, the reproducing apparatus comprising: demodulating means for demodulating any one of the copyright-protected files in one way and any one of the copyright-unprotected files in a different way; selective operation executing means operated to select either any one of the copyright-protected files or any one of the copyright-unprotected files as a file to be reproduced; and controlling means for causing the demodulating means to select one of the two different ways of demodulation depending on whether a copyright-protected file or a copyright-unprotected file has been selected by operation of the selective operation executing means.

The reproducing apparatus of the above structure permits through appropriate operations the selection of either a copyright-protected file or a copyright-unprotected file for reproduction from the storage medium. The selecting operations entail the establishment of relevant internal settings for executing a process of demodulation fit for the copyright-protected or copyright-unprotected file thus selected.

According to another aspect of the invention, there is provided a recording apparatus capable of recording copyright-protected and copyright-unprotected files to a single storage medium, the recording apparatus comprising: modulating means for modulating any one of the copyright-protected files in one way and any one of the copyright-unprotected files in a different way; selective operation executing means operated to select either any one of the copyright-protected files or any one of the copyright-unprotected files as a file to record data to; and controlling means for causing the modulating means to select one of the two different ways of modulation depending on whether a copyright-protected file or a copyright-unprotected file has been selected by operation of the selective operation executing means.

The recording apparatus of the above structure permits through appropriate operations the selection of either a copyright-protected file or a copyright-unprotected file for recording to the storage medium. The selecting operations entail the establishment of suitable internal settings for carrying out a process of modulation suitable for the copyright-protected or copyright-unprotected file thus selected.

BRIEF DESCRIPTION OF THE DRAWINGS

FIGS. 1A to 1D are a plan view, a front view, a side view, and a bottom view of a stick-shaped memory embodying the invention;

FIGS. 2A through 2E are a plan view, a top view, a right-hand side view, a left-hand side view and a bottom view of a drive apparatus embodying the invention;

FIGS. 7A through 7F are explanatory views depicting data structures for the inventive stick-shaped memory;

FIG. 8 is an explanatory view outlining a directory structure of the inventive stick-shaped memory;

FIG. 9 is an explanatory view indicating another directory structure of the inventive stick-shaped memory;

DETAILED DESCRIPTION OF THE PREFERRED EMBODIMENTS

Figure 3:
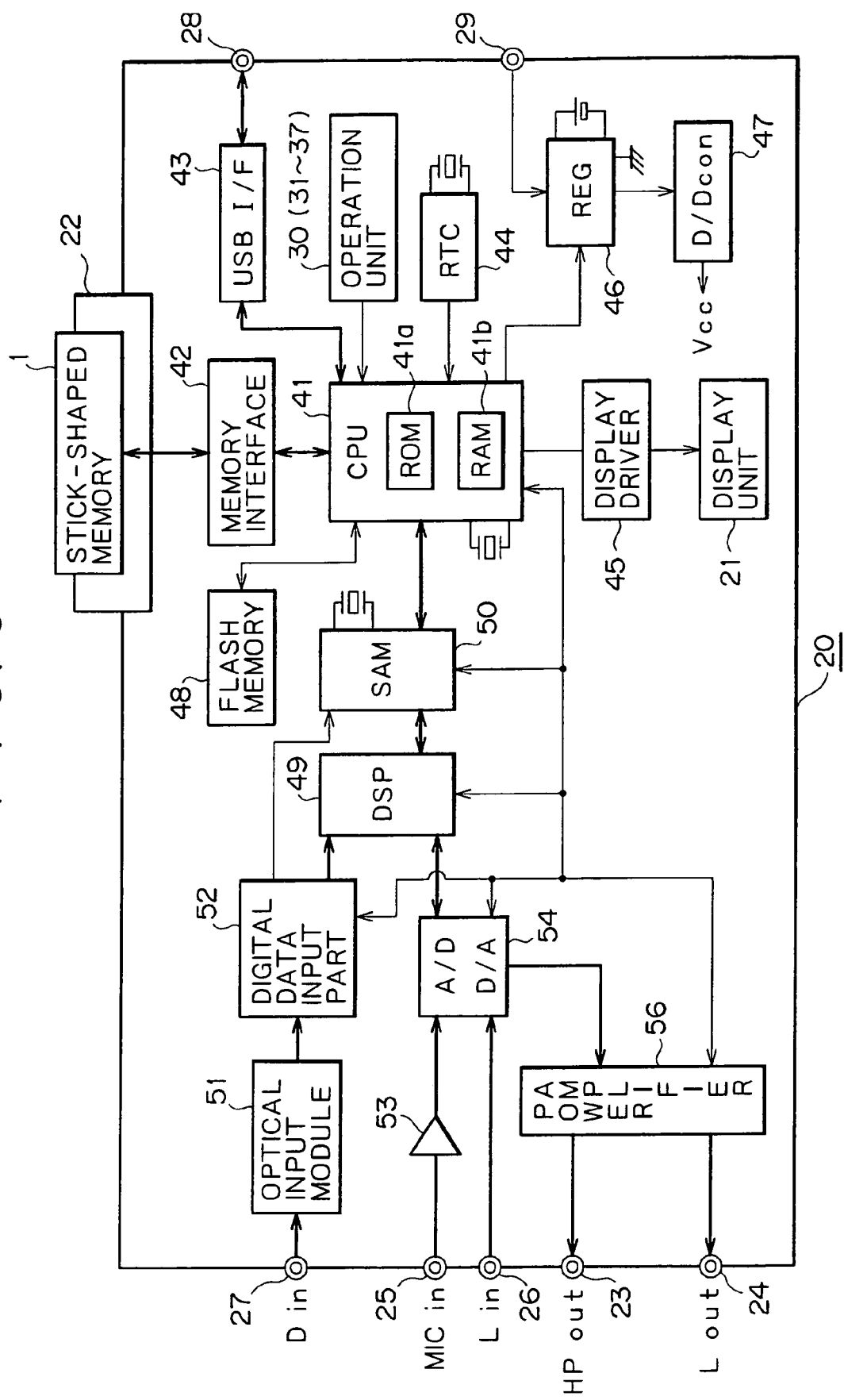
FIG. 3 is a block diagram of the inventive drive apparatus.

Preferred embodiments of this invention will now be described. The description that follows will center primarily on a memory having a stick-like external shape and working as a storage medium, and on a drive apparatus capable of recording and reproducing data to and from that memory.

The preferred embodiments will be described in the following order:
1. Stick-Shaped Memory
2. Structure of the Drive Apparatus
3. Typical System Configuration
4. File System
4-1. Processing Structure and Data Structure
4-2. Directory Structure
5. Data Reproduction by the Embodiments
6. Data Recording by the Embodiments
1. Stick-Shaped Memory Described below with reference to FIGS. 1A to 1D show an external form of a stick-shaped memory 1 embodying the invention as a storage medium.

The stick-shaped memory 1 illustratively comprises, in its stick-shaped enclosure shown in FIGS. 1A to 1D, a memory element of a predetermined capacity. The memory element may be a flash memory in this example.

FIGS. 1A to 1D give a plan view, a front view, a side view and a bottom view of the memory enclosure formed illustratively through plastic molding. The enclosure may illustratively measure 60 mm, 20 mm, and 2.8 mm, respectively, for its widths W11, W12 and W13 as indicated in FIGS. 1A and 1C.

A terminal part 2 having, say, 10 electrodes is formed from the lower front to the bottom of the enclosure. Through the terminal part 2, data are written and read to and from the memory element inside.

A notched part 3 is formed at the top left in the flat direction of the enclosure. The notched part 3 is provided to make sure that the stick-shaped memory is always inserted correctly into, say, a detachable insertion mechanism of a main body of a drive apparatus.

A label-bearing surface 4 is formed from the top to the bottom of the enclosure. A user may attach to this part a label illustratively identifying what is recorded in the memory.

A slide switch 5 is provided at the bottom of the enclosure. Suitably setting the switch prevents inadvertent erasure of recorded contents of the memory.

It has been determined that the capacity of the flash memory in the stick-shaped memory 1 is one of 4 MB (megabytes), 8 MB, 16 MB, 32 MB, 64 MB, and 128 MB.

What is known as a FAT (File Allocation Table) system is adopted as a file system for data recording and reproduction by the preferred embodiments.

Data are written at speeds ranging from 1,500 KB (kilobytes)/sec. to 330 KB/sec. in increments of 512 bytes, and are read at a speed of 2.45 MB/sec. The size of each block to be erased is 8 KB or 16 KB.

The supply voltage Vcc ranges from 2.7 to 3.6 V. A serial clock SCLK is set for 20 MHz at its maximum.

2. Structure of the Drive Apparatus

Described below with reference to FIGS. 2 and 3 is a drive apparatus 20 embodying the invention and capable of recording and reproducing data to and from the stick-shaped memory 1.

There are diverse kinds of main data that may be recorded to the stick-shaped memory 1. These data may illustratively comprise moving picture data, still picture data, hi-fi audio data (music data), voice data, and control data.

The inventive drive apparatus 20 will be shown primarily as handling hi-fi audio data (music) and voice data. That is, the drive apparatus 20 is limited in its ability illustratively to recording and reproducing audio data composed of hi-fi audio data (music data) and voice data.

FIG. 2A is a plan view, FIG. 2B a top view, FIG. 2C a right-hand side view, FIG. 2D a left-hand side view, and FIG. 2E a bottom view, of the drive apparatus 20.

Small and lightweight, the drive apparatus 20 is designed to be carried around easily by users.

The stick-shaped memory 1 is inserted into a detachable insertion mechanism 22 formed on the top of the apparatus as shown in FIG. 2B. With the stick-shaped memory 1 thus inserted, the drive apparatus 20 writes and reads to and from the memory such diverse kinds of data as music data, voice data, moving picture data, still picture data, computer-ready data, and control data.

On its flat surface, the drive apparatus 20 has a display unit 21 formed illustratively by a liquid crystal display. The display unit 21 displays reproduced images or characters, information about voice or music to be reproduced, operation guide messages, or menu screens for playback or editing operations.

A number of terminals are provided to secure connections with various devices which will be described later.

A headphone terminal 23 and a microphone input terminal 25 are formed illustratively on the top of the apparatus, as shown in FIG. 2B.

Headphones plugged into the headphone terminal 23 are supplied with reproduced audio signals allowing the user to listen to the reproduced sound.

A microphone connected to the microphone input terminal 25 allows the drive apparatus 20 to acquire audio signals picked up by the microphone. The audio signals thus obtained are recorded illustratively to the stick-shaped memory 1.

On the right-hand side of the enclosure, a line output terminal 24, a line input terminal 26 and a digital data input terminal 27 are formed as shown in FIG. 2C.

An external device connected to the line output terminal 24 using an audio cable is supplied with reproduced audio signals. Illustratively, a speaker system with its audio amplifier connected to the line output terminal 24 may allow the user to listen to music or voice reproduced from the stick-shaped memory 1. Alternatively, a mini-disc recorder or a tape recorder connected to the line output terminal 24 may get another medium to record music or voice reproduced from the stick-shaped memory 1.

An external device such as a CD player connected to the line input terminal 26 feeds the drive apparatus with audio signals supplied by the connected device. The signals thus provided may be recorded to the stick-shaped memory 1.

The digital data input terminal 27 may admit digital audio data sent over an optical cable connected thereto. If an external device such as a CD player is a digital output-compatible device and if the device is connected to the terminal 27 via an optical cable, the connection permits what is known as digital dubbing.

The left-hand side of the drive apparatus 20 is furnished illustratively with a USB connector 28 and a power supply terminal 29 as shown in FIG. 2D.

The USB connector 28 permits diverse kinds of communication and data transmission between the drive apparatus 20 and a USB-compatible device such as a personal computer having a USB interface.

The drive apparatus 20 operates from a power source provided by dry cells or by a rechargeable battery retained inside. Alternatively, an AC adapter may be connected to the power supply terminal 29 in order to tap power from an externally located commercial AC power outlet.

The types, numbers, and layout locations of the terminals outlined above are for illustrative purposes only and may be changed as needed.

For example, there may be provided an optical cable-compatible digital data output terminal, a SCSI connector, a serial port, an RS232C connector, and/or an IEEE connector.

The structures of the terminals above are well-known and will not be described further. It is possible to let one terminal double as the headphone terminal 23 and the line output terminal 24. The dual-purpose terminal may also be used as a digital data output terminal.

Likewise, a single terminal may be used alternately as the microphone input terminal 25, the line input terminal 26, or the digital data input terminal 27.

On the body of the drive apparatus 20 are such user-operated controls as an operation lever 31, a stop key 32, a recording key 33, a menu key 34, a volume-up key 35, a volume-down key 36, a hold key 37, and a music/voice changeover key 38.

The operation lever 31 is operable at least up and down (and may be pressed as well). The different manners of operation carried out by the operation lever 31 trigger playback of music and other data, rewind (REW) with auto music search (AMS), and fast forward (FF) with AMS.

The stop key 32 is operated to stop playback or recording of music and other data.

The recording key 33 designates recording of music and other data when operated.

The menu key 34 is used to edit music and other data and to establish various modes. In editing mode, actual editing operations are carried out by the operation lever 31 and data are entered by use of the menu key 34.

The volume-up key 35 and volume-down key 36 are operated to raise or lower the output volume of reproduced music and other data.

The hold key 37 is used to enable or disable the functions of the user-operated keys. Illustratively, operating the hold key 37 prevents the keys from getting inadvertently activated even if pushed accidentally while the apparatus is being carried around.

The music/voice changeover key 38 is illustratively pushed to act in a toggle fashion. That is, a hi-fi audio data file (of music data) or a voice data file is selected alternately for recording or reproduction every time the key 38 is pushed.

The operation keys have been described above only for illustrative purposes. These keys may be supplemented by such controls as cursor movement keys, numeric keys, and a rotary dial (jog dial).

A power on/off key, which is absent and has not been described above, may be implemented functionally as follows: power may be applied by operation of the operation lever 31 for playback, and removed upon elapse of a predetermined period of time through a sustained operation of the stop key 32. Obviously, a separate power key may be provided if desired.

The number of user-operated controls, their types and their layout locations may vary. FIGS. 2A through 2E show a minimum of control keys that provide the necessary functions, whereby the apparatus is reduced in size, lowered in manufacturing cost, and made more convenient to use than before.

FIG. 3 depicts an internal structure of the drive apparatus 20.

A CPU 41, in its capacity as a central processing unit of the drive apparatus 20, controls operations of various components, to be described below.

The CPU 41 incorporates a ROM 41a and a RAM 41b. The ROM 41a stores operation programs and various constants. The RAM 41b provides a working area for CPU operations.

An operation unit 30 corresponds to the above-described controls (identified by numerals 31 through 37). In response to operation input information from the operation unit 30, the CPU 41 carries out control operations defined by the operation programs.

A flash memory 48 is provided. The CPU 41 may store into the flash memory 48 system setting information on various operations such as music recoding mode, playback volume, and display mode; and terminal key data for data encryption and decryption processes.

A real-time clock 44 provides well-known clock functions, counting the time of day. The CPU 41 confirms the current time of day on the basis of time data from the real-time clock 44.

A USB interface 43 ensures a communication interface with an external device connected to the USB connector 28. Through the USB interface 43, the CPU 41 communicates data with an externally furnished personal computer or like equipment. Illustratively, control data, computer data, picture data, and audio data are transmitted and received via the interface.

A regulator 46 and a DC/DC converter 47 are provided to constitute a power supply unit. When turning on power, the CPU 41 issues a power-on command to the regulator 46. In response, the regulator 46 starts tapping power from a battery unit (made up of dry cells or rechargeable battery). If an AC adapter is connected to the power supply terminal 29, the regulator 46 rectifies or smoothes the supplied AC voltage.

The supply voltage from the regulator 46 is converted to a desired voltage level by the DC/DC converter 47. The converted voltage is fed as a working supply voltage Vcc to the component blocks.

When the stick-shaped memory 1 is inserted into the detachable insertion mechanism 22, the CPU 41 can gain access to the memory 1 through a memory interface 42 for various types of recording, reproducing and editing work on the memory contents.

The CPU 41 causes the display unit 21 to display necessary pictures by controlling a display driver 45. Illustratively, the display unit 21 displays menus and guide indications for user operations as well as contents of files recorded in the stick-shaped memory 1. If moving or still picture data are held in the stick-shaped memory 1, the data may be retrieved from the memory and displayed on a display part 21.

As described, the inventive drive apparatus 20 is provided with the digital data input terminal 27, microphone input terminal 25, line input terminal 26, headphone terminal 23, and line output terminal 24 for the input and output of audio signals (music and voice signals).

These terminals are associated with an audio signal processing stream made up of a SAM (Security Application Module) 50, a DSP (Digital Signal Processor) 49, an analog-to-digital and digital-to-analog converter 54 (called the ADDA converter hereunder), a power amplifier 56, a microphone amplifier 53, an optical input module 51, and a digital data input part 52.

The SAM 50 provides data encryption and decryption between the CPU 41 and the DSP 49, and exchanges encryption keys (terminal key: identifier). That is, the SAM 50 carries out encryption and decryption processes using terminal keys.

With this embodiment, hi-fi audio data (music data) are encrypted for copyright protection while voice data are not encrypted when recorded to the storage medium.

In this connection, the inventive drive apparatus 20 gets the SAM 50 to encrypt and decrypt only the hi-fi audio data (music data) while not subjecting voice data to encryption or decryption. A device configuration for implementing these arrangements will be discussed later.

The encryption and decryption processes by the SAM 50 handle not only user data such as the music data but also management information and added information such as a track management information file and an additional information file, to be described later.

The DSP 49 compresses and decompresses audio data under control of the CPU 41.

With this embodiment, hi-fi audio data (music data) are arranged to undergo ATRAC3 (Adaptive Transform Acoustic Coding) compression before being recorded, while voice data are subjected to ADPCM (Adaptive Delta Code Modulation) compression before recording.

ATRAC3 is an audio data compression method of relatively high sophistication. In compressing audio data, the method maintains high sound quality with a minimum of deterioration in auditory perception by taking advantage of the so-called masking effect on the sense of hearing. On the other hand, ADPCM is an audio data compression method designed to record audio data using fewer bits than the 16-bit linear PCM scheme. ATRAC3 is thus considered to provide higher sound quality than ADPCM.

The DSP 49 effects audio data compression and decompression processes compatible with both ATRAC3 and ADPCM. Given hi-fi audio data, the DSP 49 subjects the data to ATRAC3 data compression or decompression; upon receipt of voice data, the DSP 49 is switched for data compression or decompression through ADPCM. The switchover is accomplished by software (i.e., programs) under control of the CPU 41.

The digital data input part 52 subjects to an input interface process the digital audio data admitted through the optical input module 51.

The ADDA converter 54 subjects audio signals to analog-to-digital or digital-to-analog conversion.

The above blocks provide audio signal input and output as follows: a digital audio data signal entered through the digital data input terminal 27 from an external device over an optical cable is subjected to photoelectric conversion by the optical input module 51. After the conversion, the signal is sent to the digital data input part 52 for a reception process corresponding to a transmission format of the signal. Digital audio data extracted from the reception process are compressed by the DSP 49 before being fed to the CPU 41. The CPU 41 records the audio data illustratively to the stick-shaped memory 1. The data may also be encrypted by the SAM 50.

If a microphone is connected to the microphone input terminal 25, an input voice signal picked up by the microphone is amplified by the microphone amplifier 53. The amplified signal is subjected to A/D conversion by the ADDA converter 54. The digital audio data from the conversion are supplied to the DSP 49. Following a compression process by the DSP 49 (as well as an encryption process by the SAM 50 if necessary), the data are forwarded to the CPU 41. The CPU 41 records the data illustratively to the stick-shaped memory 1.

An input voice signal from an external device connected to the line input terminal 26 is subjected to A/D conversion by the ADDA converter 54. Digital audio data undergoing the conversion are fed to the DSP 49. Following a compression process by the DSP 49 (as well as an encryption process by the SAM 50 if necessary), the data are sent to the CPU 41. The CPU 41 records the data illustratively to the stick-shaped memory 1.

The CPU 41 gets the DSP 49 to decompress (and causes the SAM 50 to decrypt as needed) audio data retrieved illustratively from the stick-shaped memory 1 for output. The digital audio data thus processed are converted to an analog audio signal by the ADDA converter 54 before being fed to the power amplifier 56.

The power amplifier 56 amplifies the received signal for headphone and line output uses, and forwards the amplified signals to the headphone terminal 23 and line output terminal 24 respectively.

As will be described later, the drive apparatus 20 may get the SAM 50 to encrypt audio data (compressed data) retrieved from the stick-shaped memory 1, or audio data admitted through the digital data input terminal 27, microphone input terminal 25 or line input terminal 26 and compressed. The encrypted data may be sent through the USB terminal 28 to an external device (e.g., personal computer) via the USB interface 43.

The drive apparatus 20 may also cause the SAM 50 to encrypt audio data received from an external device connected to the USB terminal 28. The encrypted data may again be supplied to an external device through the USB terminal 28.

If an external device inputs audio data through the USB interface 53 to the drive apparatus 20, the CPU 41 may have the data recorded to the stick-shaped memory 1, or get the data decrypted by the SAM 50 and decompressed by the DSP 49 as needed before outputting the data through the headphone terminal 23 or line output terminal 24. The CPU 41 may also send the data to an external device (e.g., personal computer) through the USB interface 43 (illustratively after decrypting the received data).

The structure of the drive apparatus 20 shown in FIG. 3 is only for purpose of illustration and is not limitative of the invention.

Illustratively, a speaker arrangement may be incorporated in the apparatus for audio data output. In operation, the power amplifier 56 may feed its output to the speaker arrangement for sound output.

Figure 4:
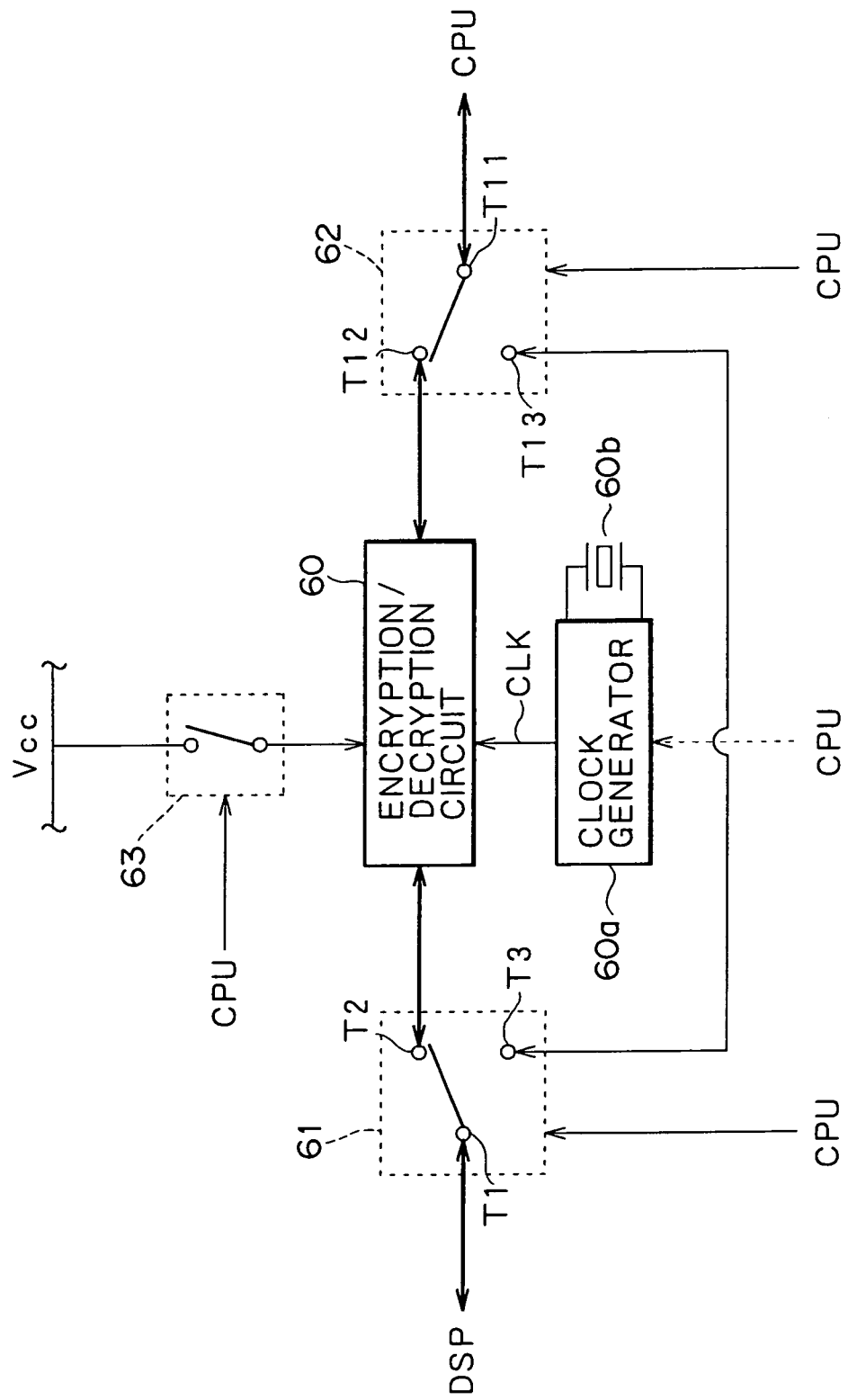
FIG. 4 is a block diagram showing an internal structure of a SAM in the drive apparatus.

FIG. 4 depicts an internal structure of the SAM 50 according to the invention. The SAM 50 includes an encryption/decryption circuit 60 for carrying out encryption and decryption processes on hi-fi audio data (music data).

A clock generator 60*a* receives an oscillation frequency from a crystal oscillator 60*b* to generate a clock signal CLK of a predetermined frequency. The encryption/decryption circuit 60 performs its processing in keeping with the clock signal CLK.

The working supply voltage Vcc is fed to the encryption/decryption circuit 60 via a switch 63. Feeding the voltage Vcc to the encryption/decryption circuit 60 gets the circuit started.

A switch 61 is provided on a data path between the encryption/decryption circuit 60 and the DSP 49. A switch 62 is provided on a data path between the encryption/decryption circuit 60 and the CPU 41.

The switch 61 is operated so as to set a terminal T1 alternately to a terminal T2 or to a terminal T3. The switch 62 acts in interlocking relation with the switch 61, setting a terminal T11 alternately to a terminal T12 or to a terminal T13. The changeover operations of the switches 61 and 62 are controlled by the CPU 41.

If the data to be recorded or reproduced are hi-fi audio data (music data), the CPU 41 connects the terminal T1 to the terminal T2 in the switch 61 and the terminal T11 to the terminal T12 in the switch 62 within the SAM 50. The switch terminal settings form a data path that links the DSP 49, encryption/decryption circuit 60, and CPU 41. Thus connected, the components work to encrypt (upon recording) or decrypt (upon reproduction) the input data.

On the other hand, if the data to be recorded or reproduced are voice data, then the CPU 41 connects the terminal T1 to the terminal T3 in the switch 61 and the terminal T11 to the terminal T13 in the switch 62. The switch terminal settings constitute a data path between the DSP 49 and the CPU 41 bypassing the encryption/decryption circuit 60. Thus connected, the components act to encrypt (upon recording) or decrypt (upon reproduction) the input data.

The switch 63, turned on and off under control of the CPU 41, is intended to stop the function of the encryption/decryption circuit 60. Illustratively, turning off the switch 63 halts feeding of the working supply voltage Vcc, which deactivates the encryption/decryption circuit 60.

Another way to turn off the encryption/decryption circuit 60 is by suitably controlling the clock. That is, the function of the clock generator 60a may be stopped or the clock frequency may be slowed down in response to a command from the CPU 41.

3. Typical System Configuration

Figure 5:
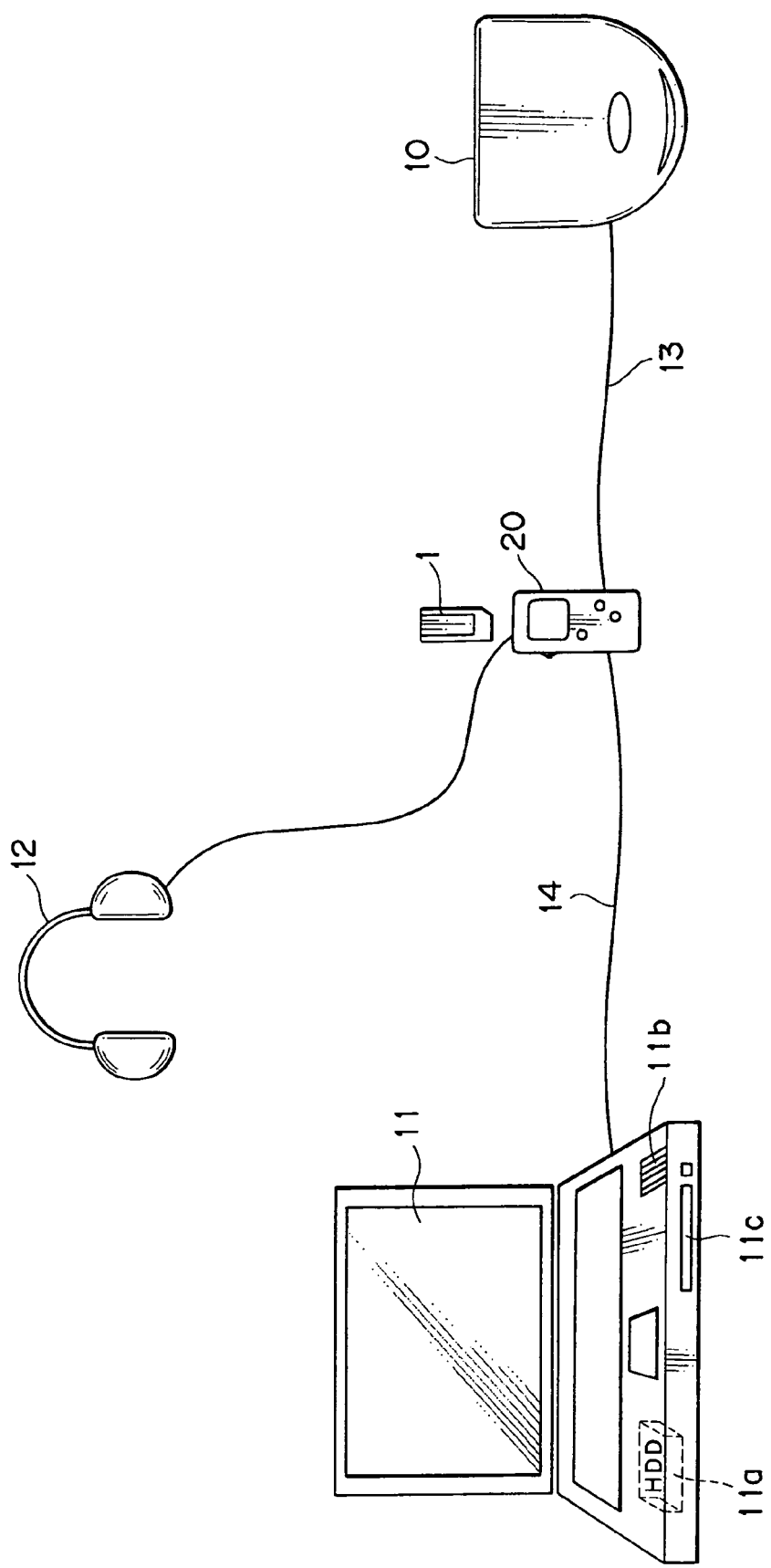
FIG. 5 is an explanatory view of a typical system configuration connecting the inventive drive apparatus with the inventive stick-shaped memory.

FIG. 5 depicts a typical system configuration centering on the drive apparatus 20.

The drive apparatus 20 may be used either as a stand-alone device or as part of a system connected communicatively to a personal computer 11 or like equipment.

As described above, when the stick-shaped memory 1 is inserted into the drive apparatus 20, the apparatus by itself can record or reproduce data to or from the memory. Illustratively, if the inserted stick-shaped memory 1 contains music data, headphones 12 may be connected to the drive apparatus 20 as shown in FIG. 4 for the user to enjoy reproduced music through the headphones.

As an externally furnished playback device, a CD player 10 may illustratively be connected to the line input terminal 26 or digital data input terminal 27 using a cable 13. The setup allows reproduced audio signals to be received from the CD player 10 and recorded to the stick-shaped memory 1.

Although not shown, a voice signal picked up by a connected microphone may be recorded to the stick-shaped memory 1. In another alternative, data may be sent from the apparatus to a connected recording device such as an MD recorder to record the data to a storage medium loaded in the recorder.

A USB (Universal Serial Bus) cable 14 may be used to connect the drive apparatus 20 with data processing equipment such as the personal computer 11. This setup allows data from the personal computer 11 to be recorded to the stick-shaped memory 1 or causes data reproduced from the stick-shaped memory 1 to be transferred to the personal computer 11 in a data copy or move operation.

The destination to which to copy or move the data is illustratively a hard disc drive (HDD) 11a inside the personal computer 11.

The personal computer 11 in the figure is shown having a speaker 11b and a CD-ROM drive 11c. Audio data reproduced from the CD-ROM drive 11c may be recorded to the stick-shaped memory 1 by the drive apparatus 20. If the audio data from the CD-ROM drive 11c are found encrypted, the drive apparatus 20 may be arranged to decrypt the data before transferring the decrypted data to the personal computer 11.

It is also possible to get the speaker 11b to perform sound output of the audio data transferred from the drive apparatus 20 to the personal computer 11.

As described above, various devices may be connected to the drive apparatus 20 to implement data recording and reproduction in ways suitable for portable use. When connected to a device commonly found in the household or at the workplace, the drive apparatus may function as part of a data recording and reproducing system.

4. File System 4-1. Processing Structure and Data Structure

A file system for a system setup of the invention using the stick-shaped memory 1 will now be described.

Figure 6:
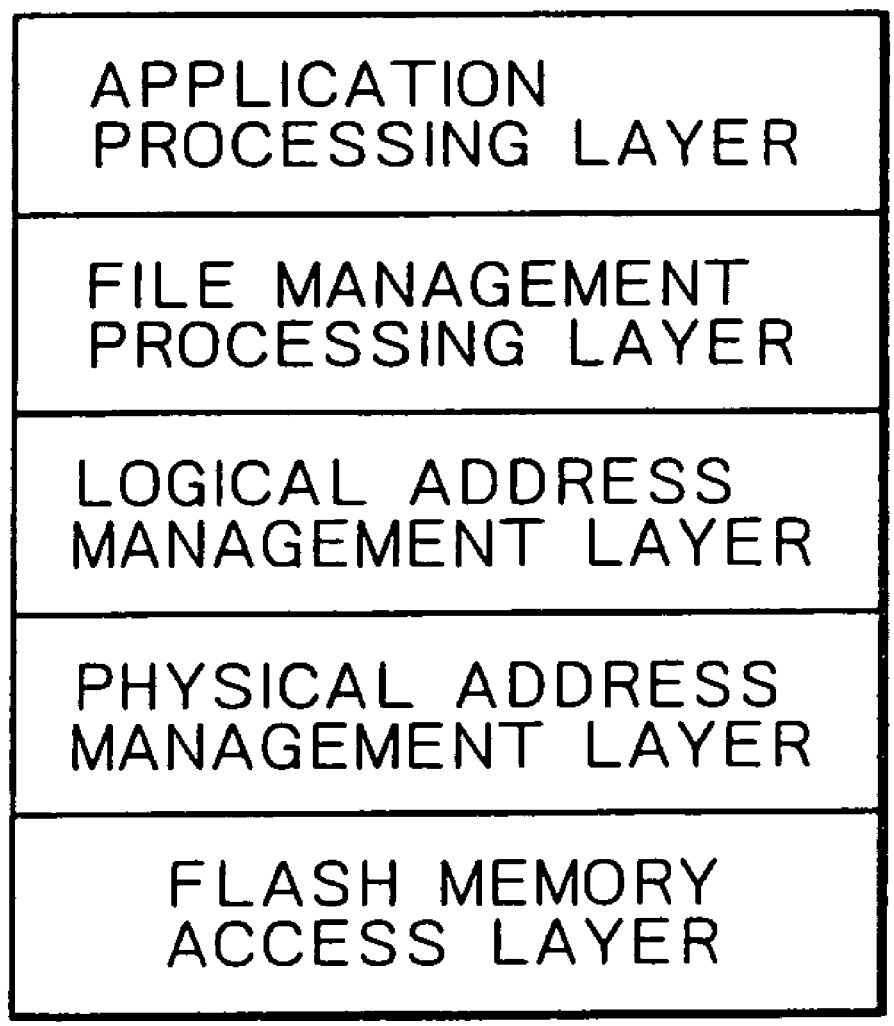
FIG. 6 is an explanatory view of a processing layer hierarchy for the inventive stick-shaped memory.

FIG. 6 depicts a file system processing hierarchy of a computer system that utilizes the stick-shaped memory as its storage medium.

In this file system processing hierarchy, an application processing layer comes at the top. Below the application processing layer are a file management processing layer, a logical address management layer, a physical address management layer, and a flash memory access layer, in that order. In this hierarchical structure, the file management processing layer represents a FAT file system. Physical addresses are assigned to blocks making up a flash memory. The relations of correspondence between the blocks and their physical addresses remain unchanged. Logical addresses are addresses that are handled logically by the file management processing layer.

FIGS. 7A through 7D depict a typical physical structure of data held in the flash memory of the stick-shaped memory 1.

Figure 7A:
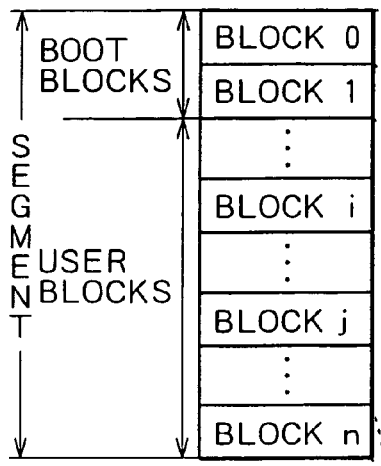

As shown in FIG. 7A, the flash memory in the stick-shaped memory 1 has data units called segments, each segment being divided into a predetermined number of blocks (of fixed length). Each block is further divided into a predetermined number of pages (of fixed length) as illustrated in FIG. 7B. In the stick-shaped memory 1, data are erased in increments of blocks, while data are written and read to and from the memory in increments of pages. The blocks are of the same size each, and so are the pages. One block ranges from page 0 to page "m."

Illustratively, each block has a capacity of 8 KB (kilobytes) or 16 KB and each page has a capacity of 512 B. The stick-shaped memory 1 as a whole may have a capacity of 4 MB (512 blocks) or 8 MB (1,024 blocks) where one block has a capacity of 8 KB; or a capacity of 16 MB (1,024 blocks), 32 MB (2,048 blocks) or 64 MB (4,096 blocks) where one block has a capacity of 16 KB.

Figure 7E:
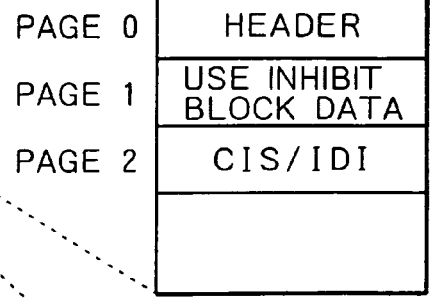
Figure 7B:
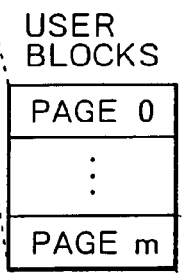
Figure 7C:
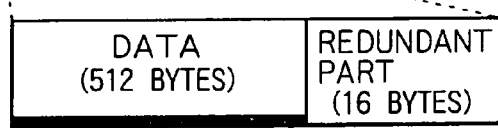
Figure 7D:
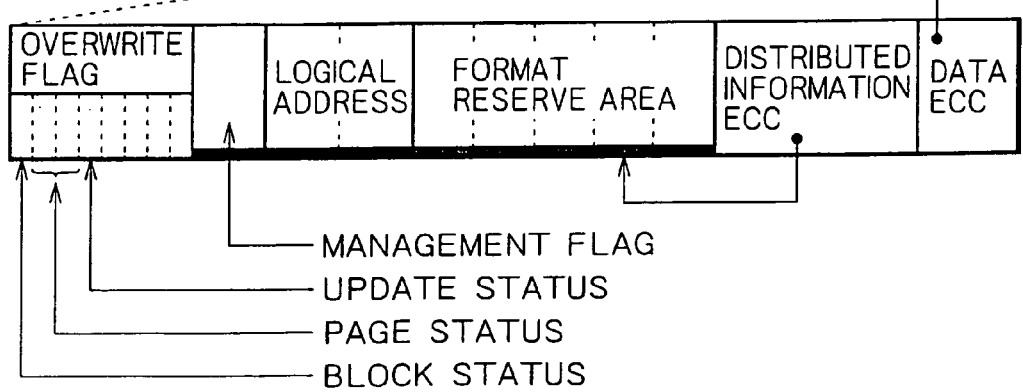

As shown in FIG. 7C, each page has a data part of 512 bytes and a redundant part of 16 bytes. The redundant part is structured as depicted in FIG. 7D. The most significant three bytes of the redundant part constitute an overwrite portion to be overwritten whenever data are updated. The three bytes store, from the most significant byte onward, a block status, a page status and an update status respectively.

The contents of the remaining 13 bytes in the redundant part are fixed in principle in keeping with the contents of the data part. The 13 bytes are made up of management flags (1 byte), a logical address (2 bytes), a format reserve area (5 bytes), a distributed information ECC (2 bytes), and a data ECC (3 bytes). The distributed information ECC constitutes error-correcting redundant data regarding the management flags, logical address, and format reserve area. The data ECC provides error-correcting redundant data regarding the 512-byte data shown in FIG. 7C.

The management flags include a system flag (set to 1 to represent a user block; to 0 to denote a boot block), a translation table flag (1: invalid; 0: table block), a copy inhibit flag (1: OK; 0: NG), and an access enable flag (1: free; 0: read protect).

In FIG. 7A, the two blocks (blocks 0 and 1) that head the segment are boot blocks. The remaining blocks are user blocks (information blocks).

Block 1 is provided for backup purposes, having the same data as those of block 1 written therein (FIG. 7F). The boot blocks top each effective block in a flash memory card and are accessed first when the stick-shaped memory 1 is inserted into the drive apparatus. The rest of the blocks are user blocks.

As shown in FIG. 7E, page 0 at the beginning of each boot block has a header, a system entry, and boot and attribute information stored therein.

Page 1 accommodates use inhibit block data.

Page 2 stores CIS (Card Information Structure)/IDI (Identify Drive Information).

The header of each boot block contains a boot block ID and the number of effective entries in the boot block in question. The system entry comprises a starting location of use inhibit block data, a size and a type of the use inhibit block data, a starting location of CIS/IDI data, and a size and a type of the CIS/IDI data. The boot and attribute information includes a type of the stick-shaped memory (read-only type, read and write enabled type, read-write hybrid type, etc.), a block size, a block count, the total number of blocks, readiness for data security, and card manufacture-related data (date of manufacture, etc.). The arrangements above make up the data structure of the stick-shaped memory 1.

The flash memory is under constraints of a limited number of data updates which, when carried out, deteriorate insulating films of the memory. This requires avoiding concentrated and repeated access to a specific memory portion (i.e., blocks). The requirement is met, when data corresponding to a certain logical address and located at a specific physical address are to be updated, by the file system of the stick-shaped memory 1 not writing the updated data to the same blocks. Instead, the updated data are written to previously unused blocks. As a result, the correspondence between a logical and a physical address following an update differs from what was in effect before the update. Such processing (called a swap process) prevents repeated and concentrated access to any one block. This helps prolong the service life of the stick-shaped memory 1 (i.e., of the flash memory).

Logical addresses accompany data written to given blocks. If a block that holds data before an update is replaced by a different block accommodating new data after the update, the same logical address is still visible from the FAT. Subsequent access to the same data is thus ensured. Because the correspondence between logical and physical addresses has been changed by a swap process, there is a need for a logical-physical address translation table that lists varying relations of correspondence between the two categories of addresses. Referencing the translation table permits identification of a physical address corresponding to a logical address designated by the FAT, whereby the block indicated by the designated physical address is accessed.

The logical-physical address translation table is held in the RAM 41*b* within the drive apparatus 20. Alternatively, the translation table may be retained in the stick-shaped memory 1.

Generally, the translation table has logical addresses (of 2 bytes each) arranged in ascending order and associated with their corresponding physical addresses (of 2 bytes each). With the flash memory designed to offer a maximum capacity of 128 MB (8,192 blocks), two bytes are used to express as many as 8,192 addresses. The logical-physical address translation table is managed in increments of segments, so that the table is increased in size in accordance with the capacity of the stick-shaped memory 1. Illustratively, where the stick-shaped memory 1 (flash memory) has a capacity of 8 MB (2 segments), two pages are used for each of the two segments in connection with the logical-physical address translation table.

Where the logical-physical address translation table is placed in the stick-shaped memory 1, any one block is indicated as one of two block types: a block in which the translation table is stored, or a block with no such table. The distinction of the block type is given by a specific bit in the management flags in the redundant part of each page.

As with disc type storage media, the stick-shaped memory 1 of the invention may be used by the FAT file system of personal computers. Although not shown in FIGS. 7A through 7F, the stick-shaped memory 1 comprises an IPL area, a FAT area and a root directory area. The IPL area contains addresses of programs to be initially loaded into a memory of the drive apparatus, along with diverse kinds of memory-related information. The FAT area includes data related to blocks (clusters). That is, the FAT has values specifying unused blocks, the number of the next block, defective blocks, and the last block. The root directory area contains directory entries (describing file attributes, history of updates, starting cluster, file size, etc.).

4-2. Directory Structure

FIG. 8 shows a typical directory structure whereby files are stored into the stick-shaped memory 1.

As mentioned above, the major data handled by the stick-shaped memory 1 are made up of moving picture data, still picture data, voice data, hi-fi audio data (music data), and control data. Under the root directory in the directory structure are "VOICE" (voice data directory), "DCIM" (still picture data directory), "MOxxxxnn" (moving picture data directory), "AVCTL" (control data directory), and "HIFI" (music data directory).

The recording and reproducing apparatus embodying the invention is designed to record and reproduce two kinds of data: audio data (voice data for this embodiment), and hi-fi audio data (music data).

First to be described below with reference to FIG. 8 is the music data directory corresponding to hi-fi audio data.

The music data directory "HIFI" includes a track information management file "TRKLIST.MSF," a track information management file backup "TRKLISTB.MSF," an additional information file "INFLIST.MSF," and a data file "A3Dnnnnn.MSA."

The data file "A3Dnnnnn.MSA" accommodates actual contents of hi-fi audio data. Audio data compressed through ATRAC3 as described earlier are stored in this file. A single data file "A3Dnnnnn.MSA" represents one piece of music. For purpose of explanation, a data file is also called a track in this specification.

The track information management file "TRKLIST.MSF" is a management file that is included in the music data directory. This file is intended for use in managing pieces of music (i.e., various data files) in the same manner as the TOC for CD and MD systems.

Blocks "NAME1" and "NAME2" are included in the track information management file "TRKLIST.MSF." The block "NAME1" is a block to which to write in one-byte code a name representing the stick-shaped memory as a whole and names of the stored pieces of music using the ASCII/8859-1 character codes. The block "NAME2" is a block to which to write in two-byte code a name denoting the stick-shaped memory as a whole and names of the stored pieces of music in MS-JIS, Korean alphabet, Chinese characters, etc.

The track information management file "TRKLIST.MSF" is recorded by use of user blocks in the stick-shaped memory 1. If the FAT in the memory 1 is found destroyed, the damaged files may be restored by use of this management file.

The track information management file "TRKLIST.MSF" is created by the CPU 41. Illustratively, whenever power is applied, a check is made to see if the stick-shaped memory 1 is being inserted. If the memory 1 is judged to be inserted, an authentication process is performed on the memory. When the stick-shaped memory 1 is judged to be authentic, the contents of the boot blocks in the memory 1 are read into the CPU 41, followed by a logical-physical address translation table.

The data thus read are placed into the RAM 41b. A FAT and a root directory are written to each brand-new stick-shaped memory 1 upon shipment from the factory.

The track information management file is created or updated when data are recorded to the memory.

If no hi-fi audio data file is recorded in the stick-shaped memory 1, then the music data directory (HIFI) is absent under the root directory. When the user wishes to record audio data to the stick-shaped memory 1 as a hi-fi audio data file by performing necessary operations, the user is prompted to create a music data directory first. Creating the music data directory also secures a management information area for accommodating a track information management file "TRKLIST.MSF" or the like.

After the hi-fi audio data file is recorded, the FAT and the track information management file "TRKLIST.MSF" are updated. Every time the hi-fi audio data file is updated, i.e., whenever the recording of data to the file has ended, the FAT and track information management file "TRKLIST.MSF" are updated in the RAM 41b. When the stick-shaped memory 1 is removed or when power is turned off, the most recent FAT and track information management file are transferred from the RAM 41b to the flash memory of the stick-shaped memory 1.

Alternatively, every time the recording of data to the hi-fi audio data file has ended, the FAT and track information management file "TRKLIST.MSF" in the stick-shaped memory 1 may be updated. Although detailed descriptions will not be given here, such editing work as erase, divide and combine operations on tracks is also reflected in an update of the track information management file "TRKLIST.MSF."

The track information management file backup "TRKLISTB.MSF" is a complete copy of the track information management file "TRKLIST.MSF." Placed in the stick-shaped memory 1, the track information management file backup "TRKLISTB.MSF" provides against accidental data destruction.

The additional information file "INFLIST.MSF" is a file that records for management purposes additional information about the stick-shaped memory 1 as a whole or about various data files (pieces of music). More specifically, the additional information file contains names of artists, ISRC codes, time-stamps, still picture data, and other additional information.

What follows is a description of the voice data directory that corresponds to voice data. The voice data directory "VOICE" indicated in FIG. 8 illustratively has an internal structure outlined in FIG. 9.

Under the directory "VOICE," there are created such subdirectories as an order file (ORDER.MSF), an additional information management file (INFO.MSF), and folders (FOLDER1, FOLDER2, etc.), as shown in FIG. 9. Each folder illustratively contains a file of actual voice data (e.g., file name "98120100.MSV").

The directory structure above has been shown only for illustrative purposes. Alternatively, each folder (FOLDER1, etc.) may have subordinate folders organized thereunder. Such a structure inside the directory "VOICE" may be created as desired for a given system upon registration with the order file ORDER.MSF.

The order file "ORDER.MSF" is a management file within the voice data directory structure. Under the voice data directory, the order file is comparable with the track information management file "TRKLIST.MSF" under the music data directory (HIFI) described above.

It follows that like the track information management file "TRKLIST.MSF," the order file "ORDER.MSF" is also created or updated in accordance with the recording or editing of voice data.

Backup copies of the order file "ORDER.MSF" and additional information management file "INFO.MSF" are always kept in the stick-shaped memory to provide against accidental destruction of data. The additional information management file is optional.

As described above in reference to FIGS. 8 and 9, there are two types of audio data, hi-fi audio data and voice data, that may be recorded to and reproduced from the stick-shaped memory 1 of the invention.

The hi-fi audio data are compressed through ATRAC3 while the voice data are compressed through ADPCM as described. ATRAC3 provides higher sound quality than ADPCM also as mentioned. Against such a background, the invention envisages subjecting the hi-fi audio data to copyright protection while exempting the voice data from such copyright protection.

In the foregoing description, the hi-fi audio data were shown encrypted while the voice data were not encrypted in accordance with the stipulated data classification for copyright protection and nonprotection. The hi-fi data are copyright-protected through encryption so that they will not be reproduced normally by an illegal or unauthorized reproducing apparatus or through an inappropriate playback procedure. On the other hand, the voice data are left unencrypted because they are not deemed in need of copyright protection.

5. Data Reproduction by the Embodiments

Figure 10:
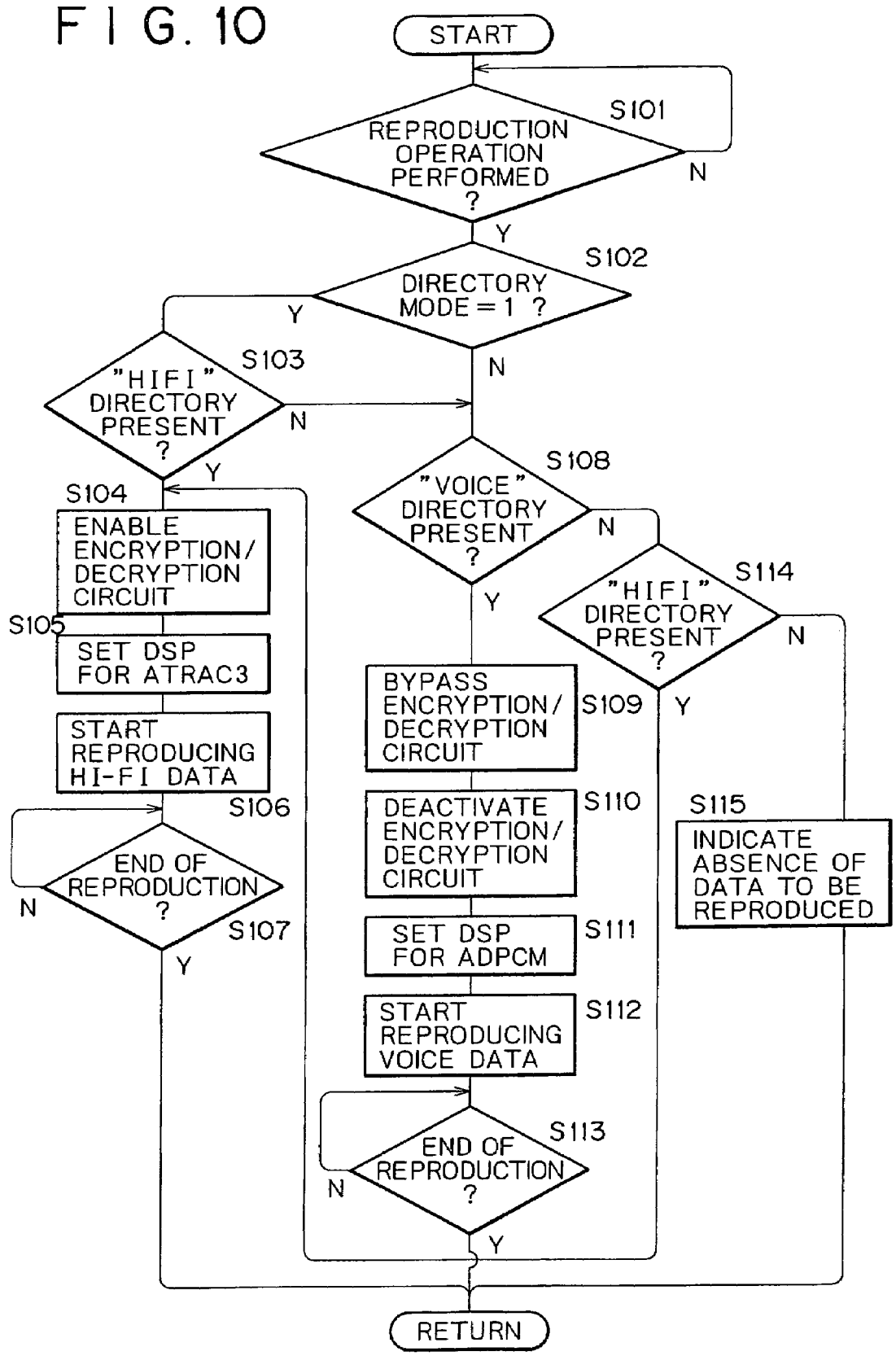
FIG. 10 is a flowchart of steps performed by the embodiments of the invention for data reproduction.

What follows is a description of how hi-fi audio data and voice data are reproduced by the drive apparatus 20 embodying the invention as depicted above. The reproduction process, to be explained with reference to a flowchart of FIG. 10, is carried out by the CPU 41.

Before getting the reproduction process started, the user operates the music/voice changeover key 38 to select either hi-fi audio data or voice data as the desired file (track) type.

Following the changeover key operation, the CPU 41 internally establishes a directory mode accordingly, as will be described later.

The CPU 41 operates illustratively as follows: in step S101, the CPU 41 waits for the operation lever 31 to be actuated to initiate the reproduction of data.

If the lever is found operated for data reproduction, the CPU 41 reaches step S102. In step S102, a check is made to see if the directory mode is set for "1." The directory mode corresponds to one of the two types of data (hi-fi audio data and voice data) which is selected by operation of the music/voice changeover key 38.

More specifically, if the hi-fi audio data type is judged to be selected by the music/voice changeover key 38, the CPU 41 sets the directory mode for "1." If the voice data type is found selected, the CPU 41 sets the directory mode for "0."

If in step S102 the directory mode is found set for "1," step S103 is reached. In step S103, a check is made to see if the currently inserted stick-shaped memory 1 contains the directory "HIFI." That is, whether or not hi-fi audio data have been recorded in the stick-shaped memory 1 is determined.

If the result of the check in step S103 is negative, step S107 is reached. If the directory "HIFI" is found to exist in step S103, then step S104 and subsequent steps are reached for hi-fi audio data reproduction.

If the directory mode is judged to be set for "0" in step S102, then step S108 is reached.

In step S108, a check is made to see if the currently inserted stick-shaped memory 1 contains the directory "VOICE." That is, whether or not voice data have been recorded in the stick-shaped memory 1 is determined.

If the result of the check in step S108 is affirmative, step S109 is reached. Step S109 and subsequent steps constitute a process for voice data reproduction. If the directory "VOICE" is not found to exist in step S108, step S114 is reached.

In step S114, the stick-shaped memory 1 is again accessed and a check is made to see if the directory "HIFI" exists. If the result of the check in step S114 is affirmative, step S104 and subsequent steps are reached. If the directory "HIFI" is not judged to exist (i.e., neither "HIFI" nor "VOICE" is present in the memory 1), then step S115 is reached.

In step S115, the CPU 41 performs a control process to get the display unit 21 indicating to the user the absence of any data that may be reproduced as audio data. The CPU 41 then exits this routine.

In step S104 and subsequent steps, hi-fi audio data are reproduced as follows:

In step S104, the encryption/decryption circuit 60 is enabled because the data to be reproduced are hi-fi audio data.

The enabling process involves turning on the switch 63 to apply power to the encryption/decryption circuit 60 while causing the clock generator 60a to generate a clock signal of a necessary frequency corresponding to the normal operation of the circuit 60. This allows the encryption/decryption circuit 60 to start processing signals.

The terminal T1 is connected to the terminal T2 in the switch 61 and the terminal T11 to the terminal T12 in the switch 62. This allows reproduced data from the CPU 41 to enter the encryption/decryption circuit 60 before reaching the DSP 49. That is, a signal processing path is constituted through which the data retrieved from the stick-shaped memory 1 are decrypted.

In step S105, the DSP 49 has its signal processing program set so as to execute an ATRAC3 data decompression process.

In step S106, reproduction of the hi-fi audio data is started. Illustratively, in keeping with a playback order designated by the track information management file "TRKLIST.MSF," a hi-fi audio data file is read from the directory "HIFI" in the stick-shaped memory 1. The retrieved data are fed to the signal processor located downstream.

As described above, the hi-fi audio data file has been compressed through ATRAC3 and encrypted. After the encryption/decryption circuit 60 is enabled in steps S104 and 105, with the DSP 49 set to carry out its ATRAC3 data decompression process, the hi-fi audio data file read from the stick-shaped memory 1 is decrypted and decompressed. The file data are eventually output as an audio signal.

In step S107, the CPU 41 waits until all hi-fi audio data files have been reproduced. Illustratively, the CPU 41 exits this routine if an operation to stop playback is carried out or if reproduction of all hi-fi audio data files held in the stick-shaped memory 1 has come to an end.

Voice data are reproduced as follows: in step S109, a process is performed to get the encryption/decryption circuit 60 bypassed in the data processing path. More specifically, the terminal T1 is connected to the terminal T3 in the switch 61 and the terminal T11 to the terminal T13 in the switch 62. This causes the reproduced data from the CPU to bypass the encryption/decryption circuit 60 to reach the DSP 49 directly. That is, the reproduced data are not subjected to a decryption process.

In step S110, a process is performed to deactivate the encryption/decryption circuit 60. Illustratively, the CPU turns off the switch 63 to stop feeding the working power supply Vcc to the encryption/decryption circuit 60. Alternatively, the CPU causes the clock generator 60a to stop generating a clock signal or to slow down in its clock frequency to bring about what is known as a sleep state.

Such a process in step S110 translates into a reduction of power consumption by the encryption/decryption circuit 60. When this embodiment operates from a battery unit, the process helps prolong the life of the battery.

In step S111, the DSP 49 has its signal processing program set so as to execute an ADPCM data decompression process.

In step S112, reproduction of the voice data is started. Illustratively, in keeping with a playback order designated by the order file "ORDER.MSF," a voice data file is read from the directory "VOICE" in the stick-shaped memory 1. The retrieve data are fed to the signal processor located downstream.

The voice data file has been compressed through ADPCM but not encrypted. In this case, the encryption/decryption circuit 60 was bypassed in the signal processing path in the earlier steps S109, S110 and S111, with the DSP 49 now set to perform its ADPCM data decompression process.

The voice data file read from the stick-shaped memory 1 is subjected to data decompression through ADPCM but not to a decryption process. This allows the decompressed data to be output as a normal voice signal.

When an end of data reproduction is detected in step S113, the CPU exits this routine.

In the reproduction process above, the user selects the desired file type by operating the music/voice changeover switch 38, and the directory "HIFI" or "VOICE" is selected accordingly for data reproduction. In particular, the embodiment permits selection of either a hi-fi audio data file or a voice data file by the user operating a single key. This provides the user with a much easier operating environment than personal computers which display illustratively a schematic directory structure on their screen for the user to operate on.

In the above reproduction process, signal processing streams are switched as per the setting of the music/voice changeover key 38 so as to reflect the different processing types of hi-fi audio data and voice data. In other words, when the signal processing streams are to be switched over, there is no need to carry out a relatively "ponderous" process such as that of successively referencing management information contents of the target file to be reproduced in order to identify the file type. A much simplified program is sufficient to judge the file type before switching the signal processing streams.

6. Data Recording by the Embodiments

Figure 11:
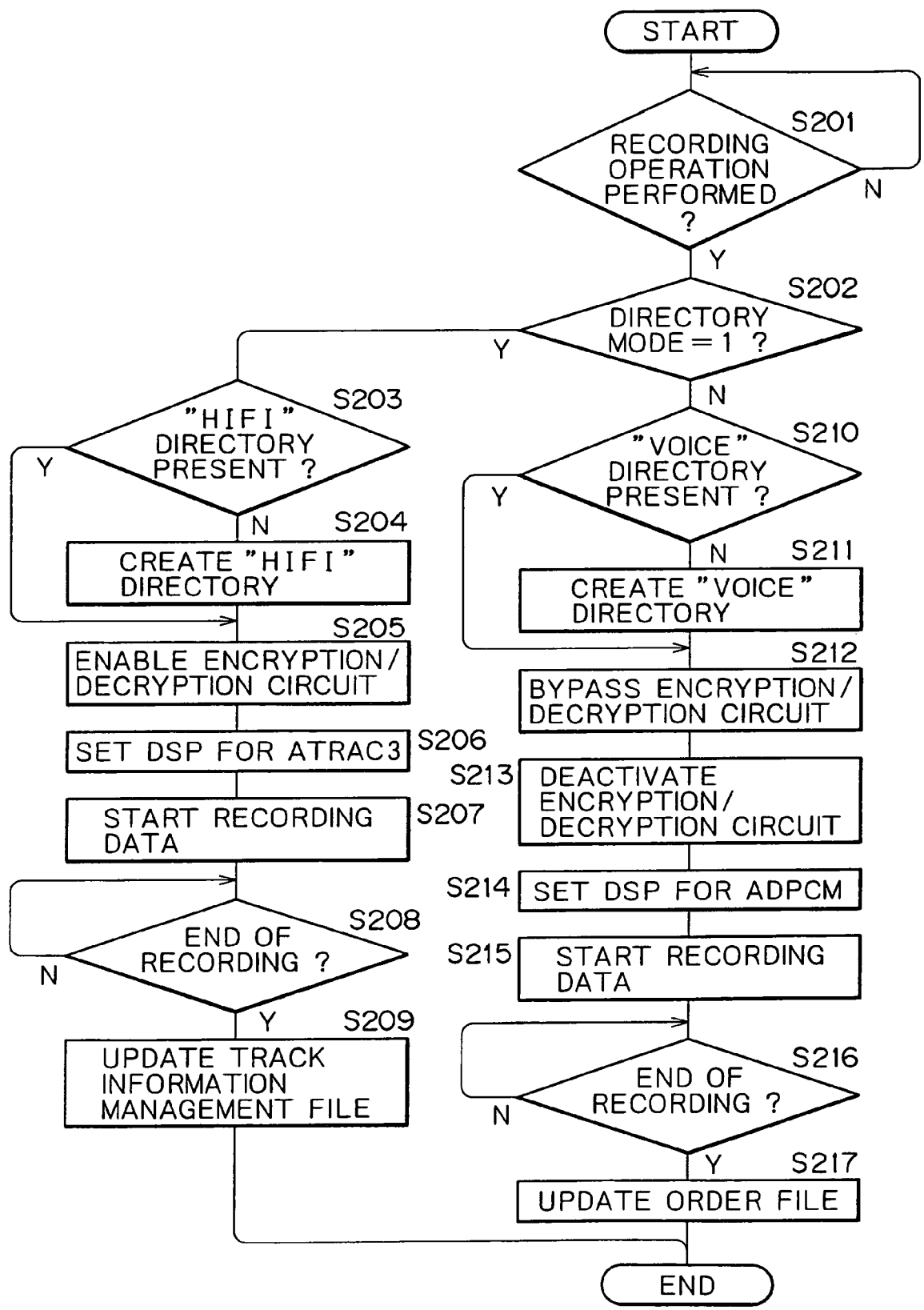
FIG. 11 is a flowchart of steps carried out by the embodiments for data recording.

What follows is a description of how audio data are recorded by the drive apparatus 20 embodying the invention. The recording process will be explained with reference to a flowchart of FIG. 11.

Before getting the recording process started, the user again operates the music/voice changeover key 38 to select either hi-fi audio data or voice data as the desired file (track) type. Following the changeover key operation, the CPU 41 internally establishes a directory mode accordingly.

Upon recording, the CPU 41 operates as follows: in step S201, the CPU 41 waits for a recording operation to be performed (on the recording key 33). If a recording operation is judged to be made, the CPU 41 reaches step S202. In step S202, a check is made to see if the directory mode is currently set for "1."

If the directory mode is judged to be set for "1" (to be compatible with hi-fi audio data), step S203 and subsequent steps are reached for the recording of hi-fi audio data. If the result of the check in step S202 is negative, i.e., if the directory mode is found set for "0" (to be compatible with voice data), then step S210 and subsequent steps are reached for the recording of voice data.

In step S203, a check is made to see if the stick-shaped memory 1 contains the directory "HIFI." If the directory "HIFI" is judged to exist already, step S205 is reached immediately. If the directory "HIFI" is not found, then step S204 is reached in which a directory "HIFI" is created before step S205 is reached.

In step S205, as in step S104 of FIG. 10, a control process is carried out to enable the encryption/decryption circuit 60. In this case, a signal processing path is formed through which the data output by the DSP 49 are subjected to encryption by the encryption/decryption circuit 60.

In step S206, the DSP 49 has its signal processing program set so as to execute an ATRAC3 signal compression process.

In step S207, recording of the hi-fi audio data is started. Illustratively, the input data are encrypted and compressed through ATRAC3 before being written to the stick-shaped memory 1.

In step S208, the CPU waits until the recording of the data terminates. Illustratively, a check is made to see whether a recording end operation is carried out or whether the storage capacity of the stick-shaped memory 1 has been exhausted. When an end of recording is thus detected, step S209 is reached.

In step S209, the track information management file "TRKLIST.MSF" in the directory "HIFI" is updated to reflect the data recorded so far. The CPU then exits this routine.

Voice data are recorded in step S210 and subsequent steps as follows: in step S210, a check is made to see if the directory "VOICE" exists as representative of recorded contents of the stick-shaped memory 1. If the result of the check in step S210 is affirmative, step S212 is reached directly. If the directory "VOICE" is not found, then step S211 is reached in which a directory "VOICE" is created. Step S211 is followed by step S212.

In steps S212 and S213, as in steps S109 and S110 of FIG. 10, control processes are performed to get the encryption/decryption circuit 60 bypassed in the signal processing path and deactivated, respectively. In step S214, the DSP 49 has its suitable program set so as to execute an ADPCM signal compression process.

In step S215, recording of the data to the stick-shaped memory 1 is started. In this case, the input data are not encrypted and are compressed through ADPCM for conversion into a voice data format before recording. The recording process continues until an end of recording is recognized in step S216.

If an end of recording is detected in step S216, step S217 is reached in which the order file "ORDER.MSF" in the directory "VOICE" is updated to reflect the recorded data. The CPU then exits this routine.

Although the description above contains many specificities, these should not be construed as limiting the scope of the invention but as merely providing illustrations of some presently preferred embodiments of this invention. It is to be understood that changes and variations may be made without departing from the spirit or scope of the claims that follow.

For example, the recording and reproduction processes may be carried out by resorting to steps other than those described above.

The storage medium compatible with the inventive apparatus is not limited to the stick-shaped memory 1 shown in FIGS. 1A to 1D. Alternatively, any of solid-state memory media of other shapes (e.g., memory chips, memory cards, memory modules, etc.) may also be used. The invention also applies to systems that use disc-type recording media such as mini-discs, DVDs (digital versatile discs), hard discs, and CD-Rs.

The above embodiments were shown dealing with audio data such as music and voice data. However, there may be cases where copyright-protected and -unprotected files coexist in a storage entity comprising other kinds of data such as picture data and program data. The invention obviously applies to these kinds of data as well in a sufficiently advantageous manner.

As described above, given a storage medium having copyright-protected and copyright-unprotected files recorded mixedly thereon, the inventive reproducing apparatus is switched over to deal with one of the two file types: copyright-protected file type, or copyright-unprotected file type. Upon data reproduction, the apparatus changes its demodulation process on the target data depending on whether the copyright-protected or copyright-unprotected data file type has been selected.

That is, where copyright-protected and -unprotected files are recorded mixedly on the storage medium, the inventive reproducing apparatus is operated by users to select the desired file type for reproduction. File reproduction is thus carried out more conveniently than before. With the desired file type selected, the reproducing apparatus has its internal settings established so as to execute the appropriate demodulation process (i.e., signal processing) pursuant to the selected file type. A typical benefit of this scheme is that there is no need to carry out relatively complex internal processes such as switching of signal processing streams by judging the file type every time a file is to be reproduced.

In its demodulation process, the inventive reproducing apparatus decrypts copyright-protected files while leaving copyright-unprotected files undecrypted. Encrypted copyright-protected files and unencrypted copyright-unprotected files, both file types being standardized, are thus handled correspondingly.

While a copyright-unprotected file is being reproduced, a decryption circuit part of the inventive reproducing apparatus may be deactivated. This provides a reduction of power consumption by the circuit part set aside for decryption purposes.

If copyright-protected standardized files adopt a data compression method different from that of copyright-unprotected standardized files, the inventive reproducing apparatus may switch its demodulation process to adapt to the specific data compression method of the selected file. Copyright-protected files or copyright-unprotected files are thus suitably decompressed for data reproduction and output.

The inventive recording apparatus is also switched over to deal with one of the two file types, copyright-protected or copyright-unprotected file type. Upon data recording, the apparatus changes its modulation process on the target data depending on whether the copyright-protected or copyright-unprotected data file type has been selected.

Again, the inventive recording apparatus is operated by users to select a copyright-protected or copyright-unprotected file in which to record the target data. With the desired file type selected, the recording apparatus has its internal modulation processing circuits switched over accordingly.

In its modulation process, the inventive recording apparatus encrypts copyright-protected files while leaving copyright-unprotected files unencrypted. Data are thus recorded appropriately in encrypted copyright-protected files or unencrypted copyright-unprotected files, both file types being standardized.

While a copyright-unprotected file is being recorded, an encryption circuit part of the inventive recording apparatus may be deactivated. This ensures a reduction of power consumption by the circuit part set aside for encryption purposes.

Where copyright-protected standardized files adopt a data compression method different from that of copyright-unprotected standardized files, the inventive recording apparatus may switch its modulation process to adapt to the specific data compression method of the selected file. Copyright-protected files or copyright-unprotected files are thus suitably compressed before being recorded to a storage medium.

What is claimed is:

1. A reproducing apparatus compatible with a storage medium storing copyright-protected audio files compressed in accordance with a first compression standard and copyright-unprotected audio files compressed in accordance with a second compression standard which is different from the first compression standard, said reproducing apparatus being capable of reproducing any one of the audio files stored on the medium, said reproducing apparatus comprising:

selective operation executing means operated to selectively choose a single audio file from among said copyright-protected audio files and said copyright-unprotected audio files as an audio file to be reproduced;

demodulating means for demodulating said single audio file in accordance with said first decompression standard or said second decompression standard which is different from said first decompression standard;

means for applying power to said demodulating means in order to enable the demodulation of said single audio file; and controlling means for causing said demodulating means to select one of the two different ways of demodulation depending on whether a copyright-protected audio file or a copyright-unprotected audio file has been selected by operation of said selective operation executing means, wherein said demodulating means is capable of decryption as a way of accomplishing the demodulation, wherein said controlling means controls said demodulating means so that said demodulating means decrypts any one of said copyright-protected audio files and does not decrypt any one of said copyright-unprotected audio files, and wherein said controlling means stops or bypasses a decryption function circuit of said demodulating means if any one of said copyright-unprotected audio files has been selected by operation of said selective operation executing means.

2. A reproducing apparatus according to claim 1, wherein said demodulating means is capable of performing data decompression by a first and a second method, the two methods being different from each other; and wherein said controlling means causes said demodulating means to subject any one of said copyright-protected audio files to data decompression by said first method and any one of said copyright-unprotected audio files to data decompression by said second method.

3. A recording apparatus capable of recording copyright-protected audio files compressed in accordance with a first compression standard and copyright-unprotected audio files compressed in accordance with a second compression standard which is different from the first compression standard to a single storage medium, said recording apparatus comprising:

selective operation executing means operated to selectively set an audio file to be recorded between a copyright-protected audio file and said copyright-unprotected audio file;

modulating means for modulating of said audio file to be recorded in accordance with said first compression standard or said second compression standard;

means for applying power to said modulating means in order to enable the modulation of said single audio file; and controlling means for causing said modulating means to select one of the two different ways of modulation depending on whether said audio file to be recorded has been set as a copyright-protected audio file or a copyright-unprotected audio file by operation of said selective operation executing means, wherein said modulating means is capable of encryption as a way of accomplishing the modulation, wherein said controlling means controls said modulating means so that said modulating means encrypts any one of said copyright-protected audio files and does not encrypt any one of said copyright-unprotected audio files, and wherein said controlling means stops or bypasses an encryption function circuit of said modulating means if any one of said copyright-unprotected audio files has been selected by operation of said selective operation executing means.

4. A recording apparatus according to claim 3, wherein said modulating means is capable of performing data compression by a first and a second method, the two methods being different from each other; and wherein said controlling means causes said modulating means to subject any one of said copyright-protected audio files to data compression by said first method and any one of said copyright-unprotected audio files to data compression by said second method.

\* \* \* \* \*